United States Patent [19]

Prust

[11] Patent Number: 6,152,117

[45] Date of Patent: Nov. 28, 2000

[54] AIR INTAKE HEATER WITH INTEGRATED POWER AND GROUND CONNECTOR

[75] Inventor: Andrew J. Prust, Coon Rapids, Minn.

[73] Assignee: Phillips & Temro Industries Inc., Eden Prairie, Minn.

[21] Appl. No.: 09/167,271

[22] Filed: Oct. 7, 1998

[51] Int. Cl.[7] .................................................. F02G 5/00
[52] U.S. Cl. .................................................. 123/556
[58] Field of Search ..................................... 123/556

[56] References Cited

U.S. PATENT DOCUMENTS

| | | | |
|---|---|---|---|
| 4,667,644 | 5/1987 | Hori et al. | 123/556 |
| 5,887,575 | 3/1999 | Thimmesch et al. | 123/556 |
| 5,908,021 | 6/1999 | Garcia | 123/556 |

*Primary Examiner*—Marguerite McMahon
*Attorney, Agent, or Firm*—Harness, Dickey & Pierce, P.L.C.

[57] ABSTRACT

A heater for the intake manifold of an internal combustion engine that includes a first heating element having a first end and a second end, a second heating element having a first end and a second end, and a first bolt assembly that mechanically couples yet electrically isolates the first end of the first heating element from the first end of the second heating element. In the heater, the first and second heating elements are electrically connected in series and the first end of said first heating element is electrically connected to the first bolt assembly. The first bolt assembly also electrically connects the first end of the second heating element to ground.

19 Claims, 3 Drawing Sheets

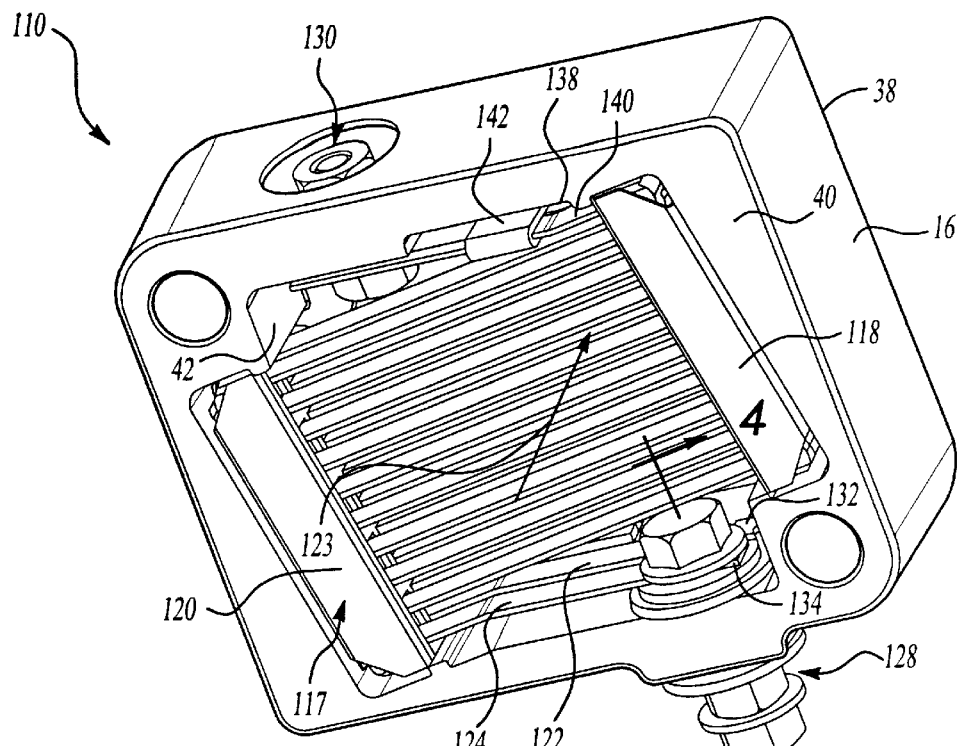
Fig-3
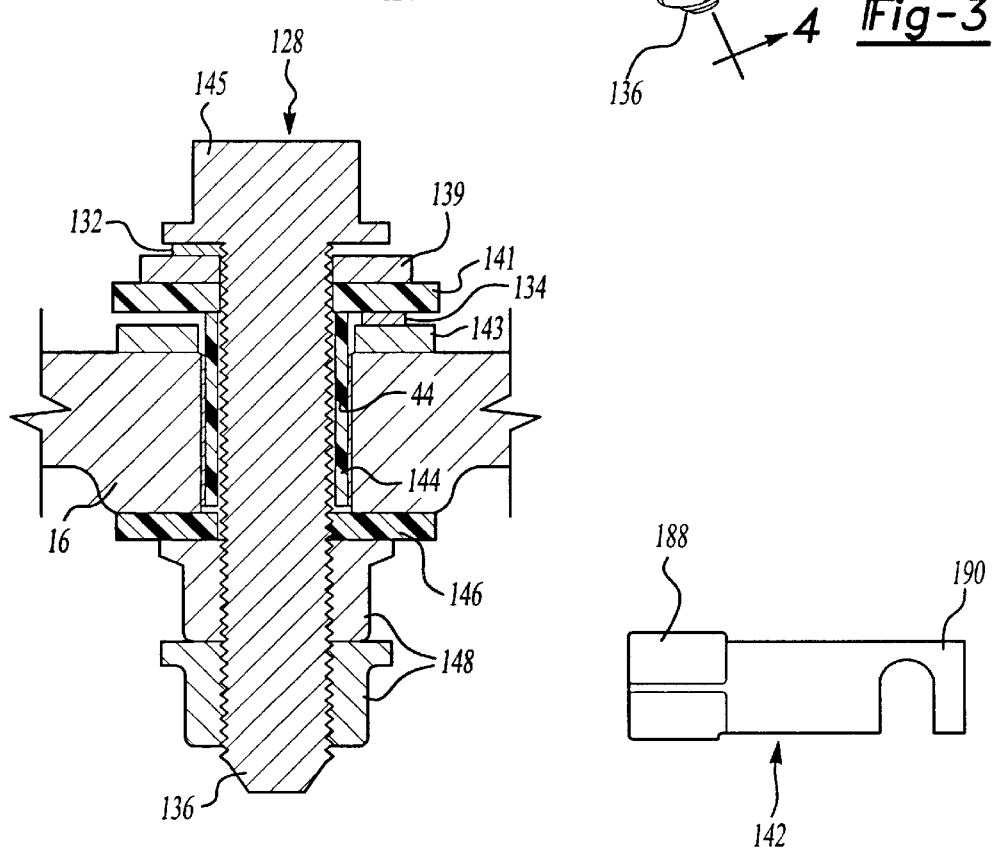
Fig-4
Fig-7

6,152,117

AIR INTAKE HEATER WITH INTEGRATED POWER AND GROUND CONNECTOR

BACKGROUND OF THE INVENTION

1. Technical Field

The invention generally relates to an apparatus for heating the air/fuel mixture entering the cylinders of an internal combustion engine. More particularly, the invention relates to an electric heater adapted for mounting within the air intake system of an engine.

2. Discussion

The air/fuel mixture entering the cylinders of an internal combustion engine is commonly heated to increase fuel economy and responsiveness to starting as well as to decrease pollutant discharge. These intake heating devices generally include a heating element disposed in the intake air passageway of an engine and electrically connected to a power source. Current is passed through the heating element or coil to increase the temperature of the air as it passes the heating element and into the air intake manifold.

While the aforementioned heaters generally address cold starting and fuel economy issues, other concerns remain. A major concern of original equipment manufacturers is product proliferation. For example, engines equipped with existing heater designs typically require an intake housing different from that of an engine not equipped with a heater. In addition, the heater configuration and dimensions may need to be varied for vehicles with a 24 volt system instead of a 12 volt system. Due to the increase in voltage supplied, multiple heating elements with multiple terminal connections were required.

The incremental cost required to support each heater, manifold, and engine variation is significant. Not only are there design costs and manufacturing costs such as tooling, prototype and inspection, each part number must be tracked within the drawing systems and bills of material. The service parts organization is also effected requiring increased space to shelve the permutation of parts. Increasingly complex inventory systems and the resulting multitude of repair manuals are likely to increase customer confusion.

Another concern arises regarding the ease of assembly of existing heaters. As the level of difficulty of assembly increases, the associated cost of production increases. In view of the above concerns, a need exists for a heater that may be utilized in a variety of applications without requiring a different intake manifold for each heater configuration.

SUMMARY OF THE INVENTION

The present invention addresses the above identified needs by providing a heater for the intake manifold of an internal combustion engine that includes a first heating element having a first end and a second end, a second heating element having a first end and a second end, and a first bolt assembly that mechanically couples yet electrically isolates the first end of the first heating element and the first end of the second heating element. In the heater, the first and second heating elements are electrically connected in series with the first end of said first heating element electrically connected to the first bolt assembly. The first bolt assembly also electrically connects the first end of the second heating element to ground. The above needs are further addressed by including first and second insulators each defining first and second cavities and a web separating the respective first and second cavities. The first heating element is disposed in the first cavities of the first and second insulators while the second heating element is disposed in the said second cavities of the first and second insulators.

BRIEF DESCRIPTION OF THE DRAWINGS

Other objects and advantages of the invention will become apparent to one skilled in the art upon reading the following specification and subjoined claims and upon reference to the drawings in which:

FIG. 3 is a perspective view of the air intake heater of the present invention;

FIG. 4 is a partial sectional view of the power/ground bolt assembly illustrated in FIG. 3 taken along the line 4—4;

FIG. 7 is a plan view of the terminal clip used in the present invention.

DETAILED DESCRIPTION OF THE PREFERRED EMBODIMENTS

Figure 1:
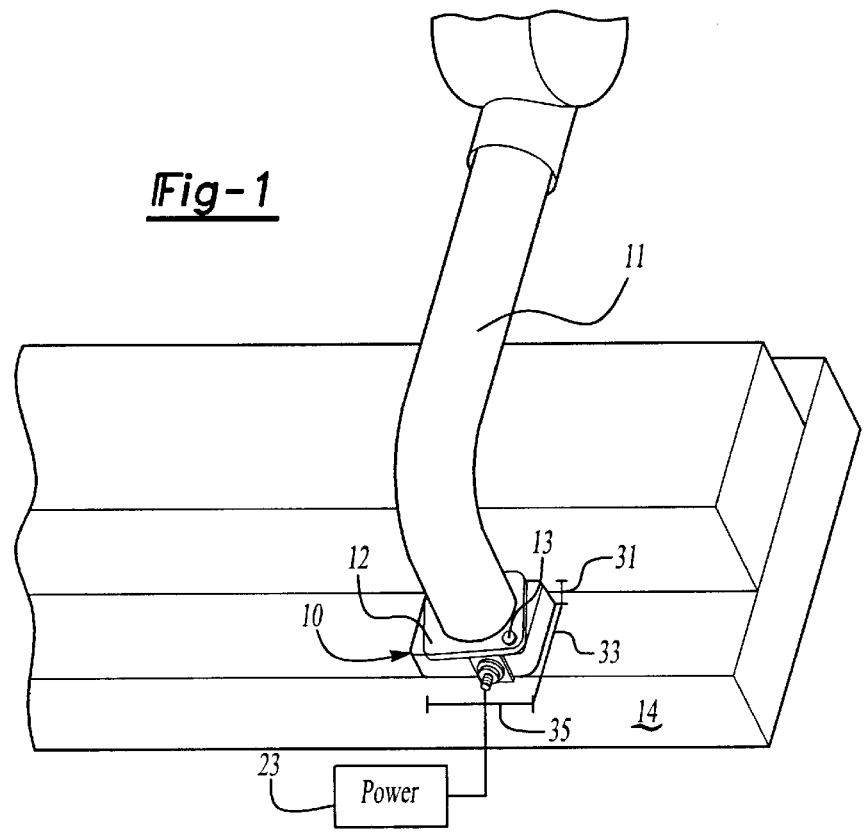
FIG. 1 is a partial side elevational view of a vehicle engine showing a heater disposed within the intake system of the vehicle.
Figure 2:
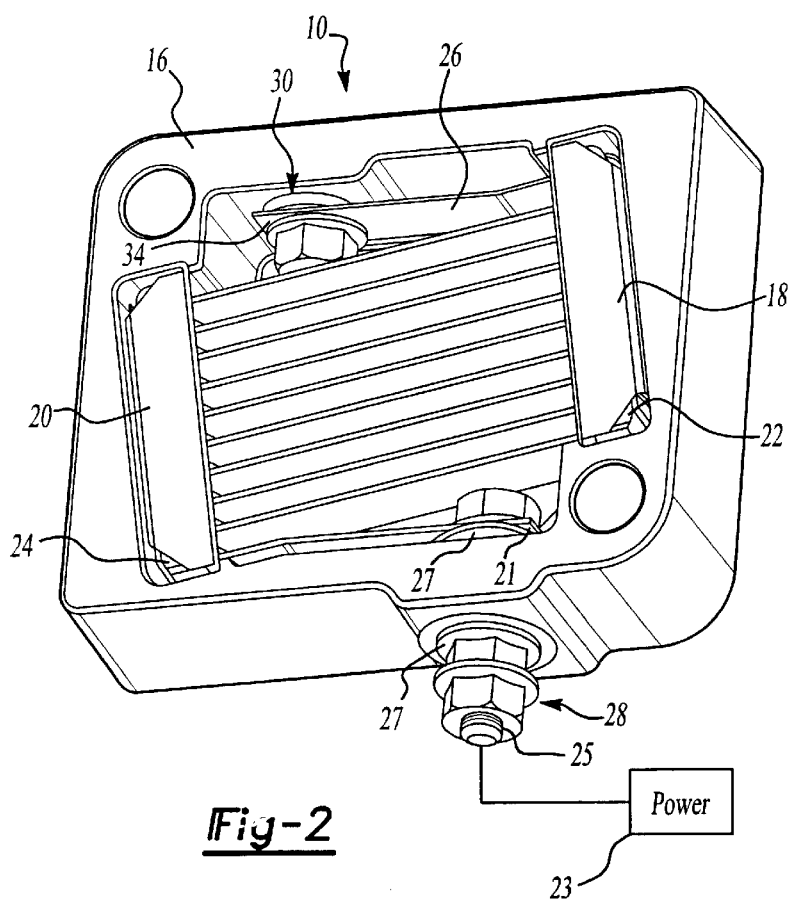
FIG. 2 is a perspective view of a twelve volt heater manufactured by the assignee of the present invention.

FIG. 1 illustrates a heater 10 connected to an air supply conduit 11 via a connecting flange 12 and bolts 13. The bolts 13 also connect heater 10 to, and in communication with, an intake manifold 14 of an internal combustion engine. FIG. 2 illustrates an intake heater assembly, such as is shown in FIG. 1, manufactured by the assignee of the present invention. The heater assembly 10 includes a housing 16, a first holder 18 and a second holder 20, bolt assemblies 28 and 30, ceramic insulators 22 and 24 disposable within holders 18 and 20, and a serpentine shaped heating element 26 retained within the holders and ceramic insulators as shown. Bolt assembly 28 mechanically couples a first end 21 of heating element 26 to housing 16, electrically connects first end 21 to a power source 23 via bolt 25, and includes an insulating sleeve (not shown) and washers 27 to electrically isolate the bolt from the housing in a manner known in the art. Bolt assembly 30 mechanically and electrically couples a second end 34 of heating element 26 to the housing. As a result of this configuration, current passes from a power source connected to first bolt assembly 28 through heating element 26 and to ground via bolt assembly 30 and the housing.

As will be appreciated from the following description, the present invention provides a heater that allows an original equipment manufacturer to manufacture a single engine and manifold for use with a single heating element or a multiple heating element heater. More particularly, a single engine may be sold with either a single heating element heater, a multiple element heater, or a spacer configured substantially the same as housing 16. As such, the claimed invention provides a cost reduction from reduced product proliferation and an additional benefit of simple retrofit for engines sold without a heater. An end user with an engine initially sold without a heater simply removes the spacer and inserts the appropriate heater.

More particularly, the present invention is directed to a heater assembly having multiple heating elements configured to accommodate a higher voltage source yet disposable within the same housing 16 described above. As best illustrated in FIG. 3, housing 16 includes a first side 38, a second side 40, and a passage 42 extending therethrough. For completeness, it should be noted that in the preferred embodiment of the present invention housing 16 is cast aluminum measuring 25.4 millimeters in height, 73 millimeters deep, and 90 millimeters wide. The height, depth, and width dimensions are illustrated in FIG. 1 by reference numerals 31, 33, and 35, respectively. Notwithstanding the above, those skilled in the art will appreciate that the heater of the present invention, and the advantages thereof, may be used in a variety of applications not described herein. Moreover, the description of materials, size, and other preferred criteria contained herein are provided to fully explain the invention and its applications to one skilled in the art and should not be interpreted to limit the scope of the invention as is defined by the appended claims.

To accommodate a higher voltage power source within the same dimensional and operational constraints as the heater shown in FIG. 2, heater 110 includes multiple heating elements coupled to holders 118 and 120 through reconfigured ceramic insulators and a single bolt assembly for communicating an electric current to the heating elements and for grounding the circuit to the housing 16.

As best illustrated in FIG. 3, a heater 110 includes a heater assembly 117 coupled to housing 16 for connection to intake 14 (FIG. 1). Heater assembly 117 includes a first holder 118 and a second holder 120 for retaining a first heating element 122 and a second heating element 124 within the heater assembly. First and second heating elements 122 and 124 have a reduced cross sectional area in comparison to heating element 26 of the heater shown in FIG. 2. Further, heating elements 122 and 124 are positioned adjacent one another in a side-by-side configuration relative to a direction of airflow 123 (FIG. 3) and are electrically connected in series with the power source. The increased effective length and reduced cross section provided by heating elements 122 and 124 relative to the configuration of heater 10 increases the resistance of heater 110 over the heater 10 thereby accommodating the increased voltage without a corresponding wattage increase. The serial connection of the heating elements is accomplished without alterations to the size and configuration of housing 16 through the use of a bolt assembly that communicates power to and grounds heating elements 122 and 124.

Figure 5:
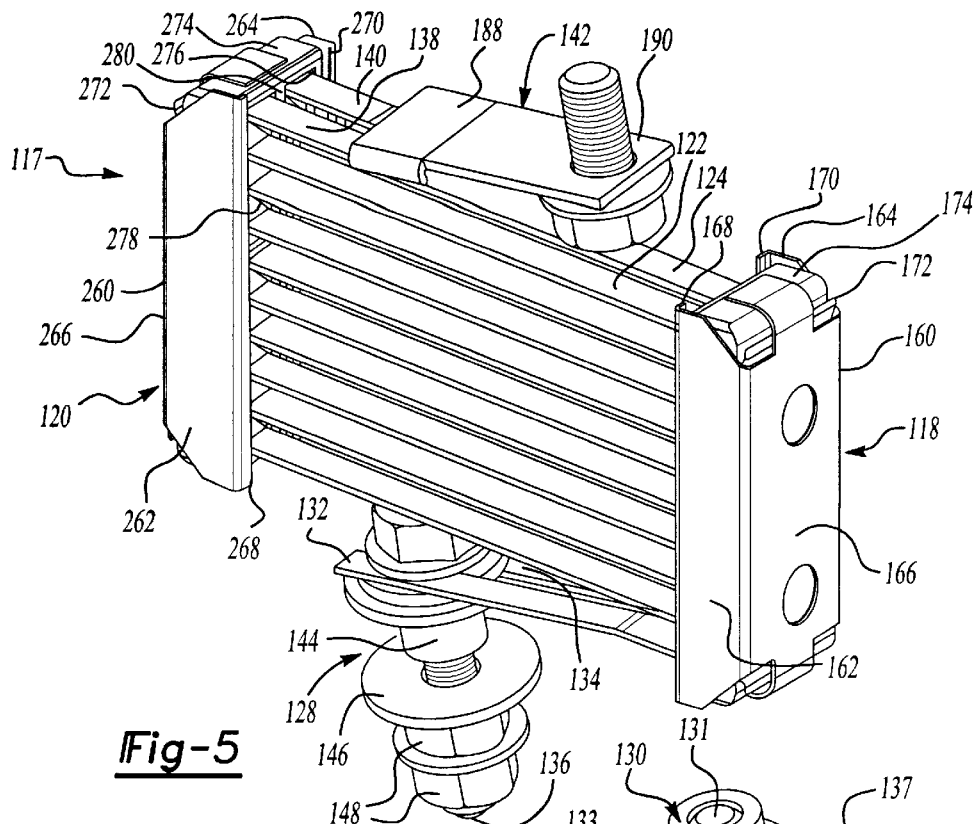
FIG. 5 is a perspective view of the heater assembly of the air intake heater shown in FIG. 3.
Figure 6:
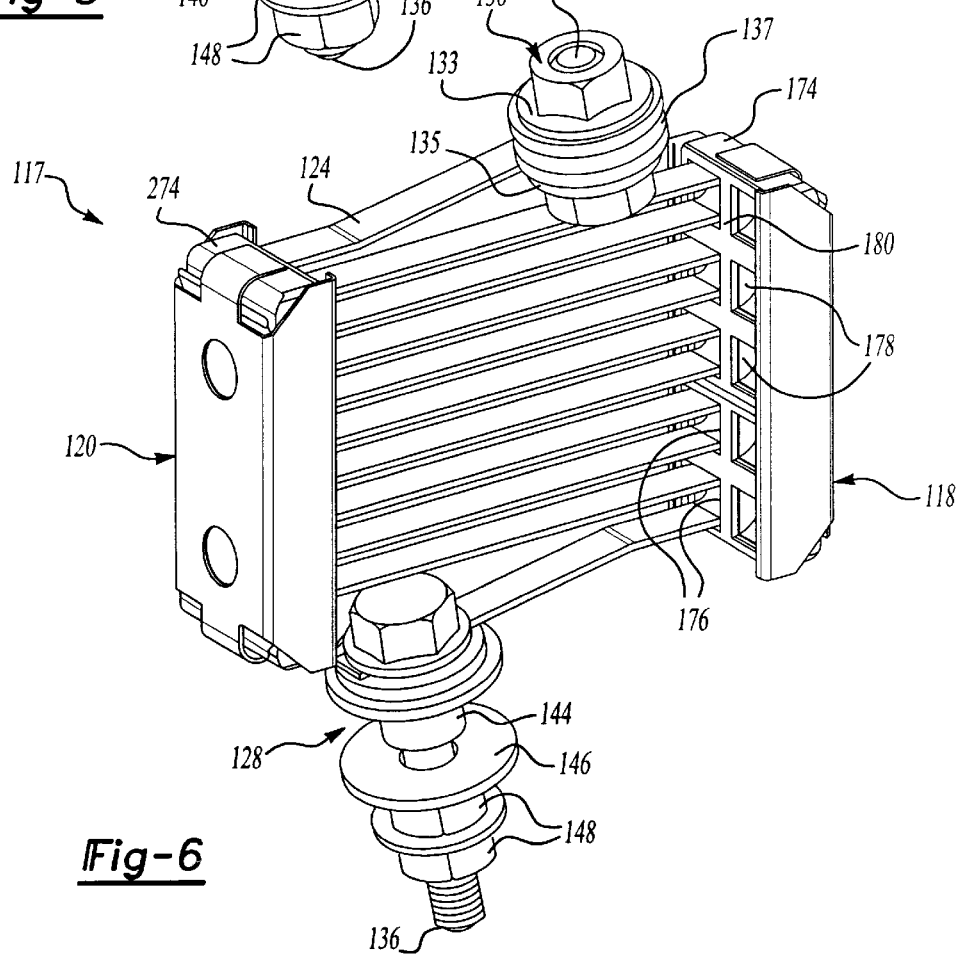
FIG. 6 is a perspective view of the heater assembly shown in FIG. 5 with one of the heating elements removed for clarity.

Heater assembly 117 includes a power/ground bolt assembly 128 and a coupling bolt assembly 130. Power/ground bolt assembly 128 mechanically couples first ends 132 and 134, respectively, of first and second heating elements 122 and 124 to housing 16 and, as shown most clearly in FIG. 4 and described below, electrically connects first end 132 of first heating element 122 to a bolt 136 and first end 134 of second heating element 124 to housing 16. Coupling bolt assembly 130 mechanically couples and electrically insulates second ends 138 and 140, respectively, of first and second heating elements 122 and 124 to housing 16. As shown in FIGS. 3, 5 and 6, the second ends 138 and 140 are electrically connected to one another via a terminal clip 142 and electrically insulated from housing 16 and bolt 131 by insulating washers 133 and 135 and an insulating sleeve 137. Those skilled in the art will appreciate that by this arrangement, first and second heating elements 122 and 124 are serially connected.

The structure and configuration of power/ground bolt assembly 128 will now be described in detail with reference to FIGS. 4 and 5. Assembly 128 includes bolt 136 formed of an electrically conductive material, a conductive washer 139, an insulating washer 141, a conductive spacer washer 143, an insulating sleeve 144, insulating washer 146, and nuts 148. When assembled, bolt 136 is disposed within an aperture 44 in housing 16 and first ends 132 and 134 of first and second heating elements 122 and 124, respectively, are positioned on opposite radial sides of bolt 136 such that end 132 is electrically connected to bolt 136 and end 134 to housing 16. More particularly, a head 145 of bolt 136 is electrically connected with first end 132 of first heating element 122, sleeve 144 insulates bolt 136 from housing 16, insulating washer 141 electrically isolates the first ends 132 and 134 of first and second heating elements 122 and 124, and first end 134 of second heating element 124 is electrically connected to housing 16 via washer 143. By this arrangement, bolt 136 is electrically connectable to a power source, electrically insulated from housing 16 and second heating element 124, and electrically connected to first heating element 122. From the above description, those skilled in the art will appreciate that heater assembly 117 allows serial connection of two heating elements with a common power/ground bolt assembly, thereby accommodating heater designs for different voltage sources in a common housing design.

In addition to the use of a common power/ground bolt assembly, the configuration of the ceramic insulators and the use of a connector clip provides assembly advantages and further adapts the heater assembly for use within the common housing 16. As with the heater shown in FIG. 2, first holder 118 of heater assembly 117 includes a channel 160 preferably stamped from stainless steel and bounded on three sides by opposed side walls 162 and 164 and end wall 166. Stops 168 and 170 extend inwardly from side walls and 164. Wave springs 172, also preferably formed of stainless steel, are disposable within channel 160 to engage end wall 166. An insulator 174, preferably formed of ceramic, is disposable within channel 160 to engage and capture springs 172 between end wall 166 and insulator 174 in a manner generally known in the art. Those skilled in the art will appreciate that wave springs 172 urge insulator 174 away from end wall 166 and into engagement with stops 168 and 170.

As shown in FIG. 5, second holder 120 is configured substantially the same as first holder 118. For convenience, like elements are referenced with like numerals increased by 100. Accordingly, those skilled in the art will appreciate that the configuration and interrelation of channel 260, side walls 262 and 264, end wall 266, stops 268 and 270, wave springs 272, and insulator 274 are substantially the same as the corresponding components earlier described.

As best illustrated in FIGS. 5 and 6, to accommodate the multiple heating elements of heating assembly 117 in the side-by-side configuration discussed above, insulators 174 and 274 each define first and second sets of cavities 178, 278, 176, and 276, respectively, separated by a web 180 and 280. The respective first sets of cavities 178 and 278 accommodate, position, and retain first heating element 122 within the insulators and between holders 118 and 120. Similarly, second sets of cavities 176 and 276 accommodate, position, and retain second heating element 124 within the insulators and between holders 118 and 120 as shown in FIGS. 5 and 6. Webs 180 and 280 separate and electrically insulate first element 122 from second element 124. Those skilled in the art will appreciate from the above description that the configuration of insulators 174 and 274 provide a compact design for accommodating the first and second heating elements 122 and 124 in the side-by-side configuration while minimizing the number of components necessary for this connection thereby providing a heating assembly that is relatively easy to manufacture and assemble.

It is contemplated that insulators 174 and 274 may be formed of a ceramic material known in the art to provide the desired thermal and electrical insulating properties. From this description and the attached drawings, those skilled in the art will appreciate that the single insulator within each holder simplifies the manufacture and assembly of the multiple heating element heater while maintaining the electrical integrity of the assembly and satisfying the dimensional concerns discussed above.

In order to further simplify manufacture and assembly and satisfy the dimensional criteria, the heater of the present invention includes a terminal clip 142 to mechanically and electrically interconnect second ends 138 and 140 of first and second heating elements 122 and 124. Terminal clip 142 is preferably stamped from a sheet of stainless steel to include a pocket end 188 and a connector end 190. Those skilled in the art will appreciate that pocket end 188 of terminal clip 142 is sized to accommodate both of heating elements 122 and 124. After insertion of the heating elements, pocket end 188 is secured to the heating elements via crimping of the pockets and spot welding. The connector end 190 of clip 142 includes an aperture 191 to mechanically couple the clip to the coupling bolt assembly 130.

Those skilled in the art will appreciate from the above description that the present invention provides an air intake heater disposable within a housing and having multiple heating elements positioned in a side-by-side configuration relative to direction of airflow and that are electrically connected in series with one another. The present invention also advantageously includes a single power/ground bolt connection and a holder and ceramic insulator configuration that retains the heating elements in a predetermined position relative to one another yet provides an overall heater design that is easy to manufacture and may be shipped in a secure yet compact arrangement.

What is claimed is:

1. A heater for heating air in the intake manifold of an internal combustion engine, said heater comprising:
   a housing having a first side, a second side, an aperture and a passage extending from said first side to said second side and defining a direction of airflow therethrough;
   a heating assembly disposed in said passage and coupled to said housing, said heating assembly including
      a first heating element having a first end and a second end,
      a second heating element having a first end and a second end, said first and second heating elements electrically connected in series, and
      a first bolt assembly mechanically coupling said first end of said first heating element and said first end of said second heating element to said housing, said first end of said first heating element electrically connected to said first bolt assembly, said first bolt assembly electrically connecting said first end of said second heating element to ground, said first heating element being on a first side of said first bolt assembly, said second heating element being on a second side of said first bolt assembly radially opposite said first side.

2. The heater of claim 1 wherein said housing is electrically connected to ground and said first bolt assembly electrically connects said first end of said second heating element to said housing.

3. The heater of claim 2 wherein said housing includes an aperture, said first bolt assembly includes a bolt disposed in said aperture, an insulating sleeve and an insulating washer electrically isolating said bolt from said housing.

4. The heater of claim 3 wherein said first heating element is positioned upstream of said second heating element relative to said direction of airflow.

5. The heater of claim 1 further including a second bolt assembly electrically connecting said first and second heating elements in series and mechanically coupling said first and second heating elements to said housing, said second bolt assembly being electrically isolated from said housing.

6. The heater of claim 5 further including a clip coupled to said second end of said first heating element and said second end of said second heating element, said clip coupled to said housing.

7. The heater of claim 6 wherein said clip electrically connects said second end of said first heating element to said second end of said second heating element.

8. The heater of claim 1 wherein said heating assembly further includes a first holder and a second holder each defining a channel, a first insulator disposed in said channel of said first holder, a second insulator disposed in said channel of said second holder, each of said first and second insulators defining a first cavity and a second cavity, said first insulator having a web separating said first and second cavities thereof, said second insulator having a web separating said first and second cavities thereof, said first heating element disposed in said first cavity of said first insulator and said first cavity of said second insulator, said second heating element disposed in said second cavity of said second insulator and said second cavity of said second insulator.

9. A heating assembly for heating air in the intake manifold of an internal combustion engine, said heating assembly comprising:
   a first heating element having a first end and a second end,
   a second heating element having a first end and a second end, said first and second heating elements electrically connected in series,
   a first bolt assembly mechanically coupling said first end of said first heating element to said first end of said second heating element, said first end of said first heating element electrically connected to said first bolt assembly, said first bolt assembly electrically connecting said first end of said second heating element to ground, said first bolt assembly including a bolt, said first end of said first heating element being on a first side of said bolt, said first end of said second heating element being on a second side of said bolt radially opposite said first side.

10. The heater of claim 9 wherein said first bolt assembly includes a bolt having a head, an insulating sleeve and an insulating washer electrically isolating said bolt to said housing, said first heating element being on a first side of said bolt, said second heating element being on a second side of said bolt radially opposite said first side.

11. The heater of claim 10 wherein said first bolt assembly further includes a conductive spacer washer, said insulating washer being between said first heating element and said second heating element, said conductive spacer washer being between said second heating element and said housing.

12. The heater of claim 9 further including a second bolt assembly electrically connecting said first and second heating elements in series and mechanically coupling said first heating element to second heating element.

13. The heater of claim 12 wherein said second bolt assembly includes a clip electrically connecting said second end of said first heating element to said second end of said second heating element.

14. The heater of claim 9 wherein said heating assembly further includes a first holder and a second holder each defining a channel, a first insulator disposed in said channel of said first holder, a second insulator disposed in said channel of said second holder, each of said first and second insulators defining a first cavity and a second cavity, said first insulator having a web separating said first and second cavities thereof, said second insulator having a web separating said first and second cavities thereof, said first heating element disposed in said first cavity of said first insulator and said first cavity of said second insulator, said second heating element disposed in said second cavity of said second insulator and said second cavity of said second insulator.

15. A heater for heating air in the intake manifold of an internal combustion engine, said heater comprising:
- a first heating element;
- a second heating element;
- a first holder defining a channel;
- a second holder defining a channel;
- a first insulator defining a first cavity, a second cavity, and a web separating said first and second cavities, said first insulator disposed in said channel of said first holder;
- a second insulator defining a first cavity, a second cavity, and a web separating said first and second cavities, said second insulator disposed in said channel of said second holder;
- said first heating element disposed in said first cavity of said first insulator and said first cavity of said second insulator, said second heating element disposed in said second cavity of said second insulator and said second cavity of said second insulator.

16. A heater for heating air in the intake manifold of an internal combustion engine, said heater comprising:
- a housing having a first side, a second side, and a passage extending from said first side to said second side and defining a direction of airflow therethrough and;
- a heating assembly disposed in said passage and coupled to said housing, said heating assembly including
  - a first heating element having a first end and a second end,
  - a second heating element having a first end and a second end, said first and second heating elements electrically connected in series and,
  - a first bolt assembly mechanically coupling said first end of said first heating element and said first end of said second heating element to said housing, said first end of said first heating element electrically connected to said first bolt assembly, said first bolt assembly electrically connecting said first end of said second heating element to ground, and,
  - a clip electrically connecting said second end of said first heating element to said second end of said second heating element, said clip coupled to said housing.

17. The heater of claim 16 further including a second bolt assembly electrically connecting said first and second heating elements in series and mechanically coupling said first and second heating elements to said housing, said second bolt assembly being electrically isolated from said housing.

18. The heater of claim 17 further including a clip coupled to said second end of said first heating element and said second end of said second heating element, said clip coupled to said housing.

19. A heater for heating air in the intake manifold of an internal combustion engine, said heater comprising:
- a housing having a first side, a second side, and a passage extending from said first side to said second side and defining a direction of airflow therethrough and;
- a heating assembly disposed in said passage and coupled to said housing, said heating assembly including
  - a first heating element having a first end and a second end,
  - a second heating element having a first end and a second end, said first and second heating elements electrically connected in series and,
  - a first bolt assembly mechanically coupling said first end of said first heating element and said first end of said second heating element to said housing, said first end of said first heating element electrically connected to said first bolt assembly, said first bolt assembly electrically connecting said first end of said second heating element to ground,
- said heating assembly further including a first holder and a second holder each defining a channel, a first insulator disposed in said channel of said first holder, a second insulator disposed in said channel of said second holder, each of said first and second insulators defining a first cavity and a second cavity, said first insulator having a web separating said first and second cavities thereof, said second insulator having a web separating said first and second cavities thereof, said first heating element disposed in said first cavity of said first insulator and said first cavity of said second insulator, said second heating element disposed in said second cavity of said second insulator and said second cavity of said second insulator.

* * * * *

UNITED STATES PATENT AND TRADEMARK OFFICE
CERTIFICATE OF CORRECTION

PATENT NO. : 6,152,117
DATED : November 28, 2000
INVENTOR(S) : Andrew J. Prust

It is certified that error appears in the above-identified patent and that said Letters Patent is hereby corrected as shown below:

Title page,
Under References Cited, U.S. PATENT DOCUMENTS, insert the following:

-- 909,898 01/1909 Hertzberg et al.; 1,068,322 07/1913 Church et al.; 1,136,845 04/1915 Tate; 1,369,551 02/1921 Schmid; 1,456,018 05/1923 Wiegand; 1,724,481 08/1929 Heginbottom et al.; 1,931,379 10/1933 Graziano; 1,931,837 10/1933 Belanger; 2,115,634 04/1938 Kiesel; 2,177,840 10/1939 Roualet; 2,668,900 02/1954 Kwartz; 3,088,447 05/1963 Henderson; 3,492,457 01/1970 Subt; 3,625,190 12/1971 Boissevain; 3,892,215 07/1975 Hickling et al.; 3,912,903 10/1975 Northrup, Jr. et al.; 4,020,812 05/1977 Hayward; 4,106,454 08/1978 Henlis; 4,108,125 08/1978 Marcoux et al.; 4,363,958 12/1982 Kobayashi et al.; 4,395,994 08/1983 Goto et al.; 4,463,721 08/1984 Hayashi et al.; 4,501,255 02/1985 Van Der Ploeg et al.; 4,651,702 03/1987 Nara et al.; 4,667,645 05/1987 Gluckman; 4,685,437 08/1987 Tanaka et al.; 4,870,249 09/1989 Kayanuma et al.; 4,944,260 07/1990 shea et al.; 5,595,164 01/1997 Thimmesch; 5,666,804 09/1997 Sekiya et al.; 5,743,242 04/1998 Thimmesch --

Under FOREIGN PATENT DOCUMENTS, Insert the following:

-- 4410820 10/1994 Germany; 6291649 04/1987 Japan; 2067245 07/1981 Great Britain; 667509 03/1952 Great Britain; 867019 09/1941 France; 771774 04/1934 France; 648536 12/1928 France; 194009 03/1923 Great Britain --

UNITED STATES PATENT AND TRADEMARK OFFICE
CERTIFICATE OF CORRECTION

PATENT NO.   : 6,152,117
DATED        : November 28, 2000
INVENTOR(S)  : Andrew J. Prust It is certified that error appears in the above-identified patent and that said Letters Patent is hereby corrected as shown below:

OTHER DOCUMENTS,
Insert the following:

-- Photographs of heater manufactured by NGK Insulators, Ltd. --

Column 4,
Line 30, after "walls" insert -- 162 --

Column 8,
Line 18, insert semi-colon after "therethrough"

Signed and Sealed this

Eighteenth Day of December, 2001

Attest:

Attesting Officer

JAMES E. ROGAN
Director of the United States Patent and Trademark Office